United States Patent
Sato et al.

(10) Patent No.: US 7,838,069 B2
(45) Date of Patent: Nov. 23, 2010

(54) METHOD OF MANUFACTURING A SEMICONDUCTOR NANOPARTICLE

(75) Inventors: Keiichi Sato, Tokyo (JP); Susumu Kuwabata, Osaka (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 1283 days.

(21) Appl. No.: 11/046,715

(22) Filed: Feb. 1, 2005

(65) Prior Publication Data

US 2005/0170530 A1   Aug. 4, 2005

(30) Foreign Application Priority Data

Feb. 2, 2004   (JP)  ............... 2004-025250

(51) Int. Cl.
B05D 7/00 (2006.01)
(52) U.S. Cl. .............. 427/220; 427/212; 427/216
(58) Field of Classification Search .......... 427/212, 427/216, 220
See application file for complete search history.

(56) References Cited

U.S. PATENT DOCUMENTS

| | | | |
|---|---|---|---|
| 6,251,303 B1 | 6/2001 | Bawendi et al. | |
| 6,977,182 B2 * | 12/2005 | Sato et al. | 438/5 |
| 7,329,369 B2 * | 2/2008 | Sato et al. | 252/301.36 |
| 2001/0019806 A1 * | 9/2001 | Sato et al. | 430/138 |

FOREIGN PATENT DOCUMENTS

| | | |
|---|---|---|
| EP | 1 333 064 A2 | 1/2003 |
| EP | 1 384 757 A1 | 7/2003 |
| JP | 2005-105155 | 9/2003 |
| WO | WO 00/17655 | 9/1999 |

OTHER PUBLICATIONS

Torimoto et al., "Characterization of Ultrasmall CdS Nanoparticles Prepared by the Size-Selective Photoetching Technique," J. Phys. Chem. B 2001, 105, pp. 6838-6845.*
Gaponik et al., "Thiol-Capping of CdTe Nanocrystals: An Alternative to Organometallic Synthesis Routes," J. Phys. Chem. B 2002, 106, 7177-85.*
Masahide Miyake et al., "Photoelectrochemical Characterization of Nearly Monodisperse CdS Nanoparticles—Immobilized Gold Electrodes", Langmuir, vol. 15, No. 4, 1999, pp. 1503-1507.
Tsukasa Torimoto et al., "Characterization of Ultrasmall CdS Nanoparticles Prepared by the Size-Selective Photoetching Technique", J. Phys, Chem. B, vol. 105, 2001, pp. 6838-6845.
European Search Report dated Oct. 25, 2007.
Japanese Patent Office Notice of Reasons for Rejection for Japanese Application No. 2004-025250, mailed Jun. 24, 2008, in Japanese.

* cited by examiner

*Primary Examiner*—Michael Cleveland
*Assistant Examiner*—Robert Vetere
(74) *Attorney, Agent, or Firm*—Stites & Harbison, PLLC; Juan Carlos A. Marquez, Esq.

(57) ABSTRACT

A reaction in which a surface-treating material for providing a semiconductor nanoparticle with one or more kinds of electron-releasing groups is added and in which the electron-releasing groups are arranged on the surface of the semiconductor nanoparticle is accelerated by irradiating the semiconductor nanoparticle with light during surface modification, thereby reducing the reaction time.

11 Claims, 8 Drawing Sheets

METHOD OF MANUFACTURING A SEMICONDUCTOR NANOPARTICLE

BACKGROUND OF THE INVENTION

1. Field of the Invention

The invention relates to a method of manufacturing a semiconductor nanoparticle with excellent light-emitting properties.

2. Description of Related Art (Semiconductor Nanoparticles)

Nanoparticles, such as semiconductor nanoparticles, are characterized in that they can emit strong fluorescence having a narrow full width at half maximum (FWHM). The nanoparticles are capable of producing various fluorescent colors, and it is thought that they will provide an extremely wide range of applications in the future. For these reasons, they are now gaining much attention as a material.

Since semiconductor nanoparticles with particle sizes of not more than 10 nm are located in the transition region between bulk semiconductor crystals and molecules, they exhibit physicochemical properties that are different from those of either the bulk semiconductor crystals or molecules. In such a region, the degeneracy of energy bands that is observed in bulk semiconductors is removed and the orbits become discrete, and a quantum size effect appears in which the energy width in the forbidden band changes depending on particle size. Due to the appearance of the quantum size effect, the width of energy in the forbidden band decreases or increases in response to an increase or decrease of particle size. The change in the energy width in the forbidden band influences the fluorescent properties of the particle. A particle with a small particle size and hence with a large energy width in the forbidden band has shorter fluorescent wavelengths, while a particle with a large particle size and hence with a smaller energy width in the forbidden band has longer fluorescent wavelengths. Namely, the semiconductor nanoparticle is a material capable of producing any desired fluorescent colors through control of particle size, resulting in the attention it is gaining.

(Methods of Manufacturing Semiconductor Nanoparticles)

In order to utilize the semiconductor nanoparticle as a fluorescent material, particle size must be controlled. In addition, if particle size could be monodispersed, it could be expected that semiconductor nanoparticles would be prepared that would have preferable fluorescent properties exhibiting a spectrum profile with narrow FWHM.

The semiconductor nanoparticle manufacturing process can be roughly divided into the preparation of particles and the monodispersion of particle sizes. Particles can be easily prepared by dissolving equimolecular amounts of precursors of Cd and X (X is S, Se, or Te). This is the same for manufacturing using CdSe, ZnS, ZnSe, HgS, HgSe, PbS, PbSe, and so on. The thus prepared semiconductor nanoparticles exhibit a wide particle distribution, for which a technique has been further attempted to monodisperse the particle distribution. For example, particle separation is conducted with high accuracy using a chemical technique in order to separate and extract only nanoparticles of a particular particle size. Examples of this method that have so far been reported include the electrophoretic separation method, taking advantage of the variations of nanoparticle surface charge that depends on particle size; the exclusion chromatography, taking advantage of differences in retention time that depends on particle size; and the size-selective precipitation method, taking advantage of differences in dispersibility into an organic solvent that depends on particle size.

In the aforementioned method, semiconductor nanoparticles prepared by mixing precursors are classified according to particle size. However, a method has also been reported that attempts to carry out the preparation of particles and the monodispersion of particle sizes at the same time. A typical example is a reversed micelle method. In this method, amphipathic molecules, such as diisooctyl sodium sulfosuccinate, and water are mixed in an organic solvent, such as heptane, thereby forming a reverse micelle in the organic solvent, such that precursors react with each other using only the aqueous phase in the reverse micelle. The size of the reverse micelle is determined by the quantitative ratio of the amphipathic molecules to the water, so that the size can be relatively uniformly controlled. The size of the nanoparticle prepared is dependent on the size of the reverse micelle, so that it is possible to prepare semiconductor nanoparticles with relatively uniform particle sizes. Other methods for simultaneously preparing particles and monodispersing particle sizes are disclosed in J. Phys. Chem. B. 101: 9463 (1997), J. Electrochem. Soc. 145: 1964 (1998), J. Phys. Chem. B. 105: 6838 (2001), and JP Patent Publication (Kohyo) No. 2001-523758 A, for example, wherein the Ostwald ripening phenomenon is utilized with the use of trioctylphosphine (TOP) or trioctylphosphineoxide (TOPO). However, the preparation methods disclosed in the above reports are characterized in that a reagent with high toxicity is synthesized at high temperatures and are therefore not necessarily superior from the viewpoint of safety.

An alternative method called size-selective photoetching method takes advantage of photochemical reaction. In this method, the particle sizes in a solution of semiconductor nanoparticles prepared with a wide particle size distribution are monodispersed by utilizing the oxidative dissolution of a metal chalcogenide semiconductor upon light irradiation in the presence of dissolved oxygen. For example, when CdS nanoparticles are optically excited in the presence of dissolved oxygen, the excited electrons promote a reduction reaction in which oxygen is reduced, and the holes promote an oxidation reaction in which the CdS nanoparticles themselves are dissolved. This photocatalytic reaction proceeds while the semiconductor nanoparticles are excited. Namely, the dissolving reaction of all of the excited semiconductor nanoparticles ends with particle size that has a forbidden band width corresponding to the energy of the minimum wavelength of the irradiating light. Specifically, by irradiating the semiconductor nanoparticles having a wide particle size distribution with light with a shorter wavelength than the wavelength of the absorption edge of the semiconductor nanoparticles, semiconductor nanoparticles with large particle sizes can be selectively irradiated and dissolved into smaller, uniform semiconductor nanoparticles. For example, when the monochromatic light with a wavelength of 476.5 nm is used for irradiation, the average particle size would be 3.2 nm and the standard deviation would be 0.19 nm, thus indicating a very narrow particle size distribution where the standard deviation is approximately 6% of the average particle size. In this method, nanoparticles that are monodispersed at any desired particle size can be relatively safely prepared at room temperature by simply selecting the irradiating light wavelength. Moreover, by using monochromatic light for irradiation, the monodispersing process can be more accurately performed.

(Problems in Fluorescent Properties)

However, the fluorescent properties of the semiconductor nanoparticles prepared by these methods exhibit a smooth fluorescent spectrum without any peaks. Moreover, the fluorescent spectrum has peaks at a different wavelength than the theoretical values of fluorescence at which the semiconductor nanoparticles are supposed to emit light. Namely, besides the band gap fluorescence emitted from the inside of the semiconductor nanoparticles, the semiconductor nanoparticles emit a totally separate fluorescence that is believed to be emitted by an energy level that exists in the forbidden band of energy levels inside the semiconductor nanoparticles. The energy level producing the separate fluorescence is thought to exist mainly on the surface site of the semiconductor nanoparticles. This is a phenomenon obstructing the properties of the semiconductor nanoparticles with a narrow particle size distribution and has been a problem to be solved, as a change in fluorescent properties caused through control of the size of semiconductor nanoparticles is supposed to be reflected in the band gap fluorescence.

In a typical method of solving the aforementioned problem, a semiconductor material as a core is coated with another semiconductor material, an inorganic material, and an organic material that have a wider band gap than that of the core's semiconductor material, thus constructing a layered structure in an attempt to suppress the aforementioned fluorescence.

In typical methods of coating an inorganic material, a CdSe nanoparticle is coated with CdS, as described in J. Phys. Chem. B. 100: 8927 (1996), a CdS nanoparticle is coated with ZnS, as described in J. Phys. Chem. 92: 6320 (1988), and a CdSe nanoparticle is coated with ZnS, as described in J. Am. Chem. Soc. 112: 1327 (1990). With regard to the coating of a CdSe nanoparticle with ZnS as described in J. Phys. Chem. B. 101: 9463 (1997) or JP Patent Publication (Kohyo) No. 2001-523758 A, a semiconductor nanoparticle that has sufficient fluorescent properties has been successfully obtained by adopting a manufacturing method that utilizes the Ostwald ripening phenomenon and that is conducted in a coordination solvent.

The complex-layered semiconductor nanoparticle described above is a material that has a larger band gap than that of the semiconductor nanoparticle. The coating with a substance that does not have a band gap in the forbidden band of the semiconductor nanoparticle is carried out in an attempt to suppress the defective site on the surface of the semiconductor nanoparticle and obtain the inherent fluorescent properties of the semiconductor nanoparticle.

A method of performing a surface treatment in an aqueous solution is disclosed in J. Am. Chem. Soc. 109: 5655 (1987), in which it is reported that the fluorescent properties of the semiconductor nanoparticle in an alkaline aqueous solution has improved. Although various experiments and reports have been made based on this report, none have successfully shed light on the mechanism of such an improvement (J. Phys. Chem. Soc. 100: 13226 (1996) and J. Am. Chem. Soc. 122: 12142 (2000), for example). Moreover, all of the semiconductor nanoparticles in the alkaline aqueous solution have poor reproducibility, such that the conditions for reproduction have not been identified. Furthermore, none of the experiments and reports have successfully isolated a final substance.

As an example of the method of coating with an organic material, there is a synthesizing method that utilizes the Ostwald ripening phenomenon in a coordination solvent. This method employs TOPO (trioctylphosphine) or hexadecylamine (HDA) as the coating material, for example, to obtain semiconductor nanoparticles with excellent light-emitting properties (J. Phys. Chem. B. 101: 9463 (1997)). It should be noted, however, that the final product of the semiconductor nanoparticle is not water-soluble.

The semiconductor nanoparticle obtained by the above-described methods is capable of suppressing a defect site to some extent and has the inherent properties of a semiconductor nanoparticle to some extent. However, in order to prepare such a semiconductor nanoparticle, a highly sophisticated technique is required, and in order to achieve high quality, a variety of equipment is required. Further, they are seriously deficient for the purpose of industrial production in terms of the cost of reagents or the like and the safety during high temperature reaction.

Against these backgrounds, the inventors realized that it would be possible to synthesize a semiconductor nanoparticle with excellent light-emitting properties by modifying, using a thiol, for example, monodispersed semiconductor nanoparticles prepared by a size-selective photoetching method, and then causing electron-releasing groups to be arranged on the surface of the thus modified nanoparticles in order to modify their surface. Hereafter, conventional methods of synthesis are described.

(Method of Monodispersing Semiconductor Nanoparticles by Size-selective Photoetching: Conventional Method)

Semiconductor nanoparticles have a very large proportion of surface area with respect to their volume and therefore tend to flocculate very strongly. Thus, in order to allow the semiconductor nanoparticles to exist in a stable manner, measures must be taken to prevent the collision and fusion of particles. Various measures have so far been devised for this purpose, and they can be roughly divided into two types. One is the physical isolation of the individual semiconductor nanoparticles by placing them in a solid matrix and a polymer matrix, and the other is the inactivation of the particle surface by chemically modifying the metal ion site on the particle surface with a low-molecule organic matter that is highly capable of forming a complex with the metal ion site. The present method is based on the latter concept and employs hexametaphosphate as a stabilizing agent.

An aqueous solution of hexametaphosphate and cadmium perchlorate was prepared and adjusted to a certain pH. The solution was then subjected to bubbling using nitrogen gas, and hydrogen sulfide gas is poured into the solution while vigorously stirring, such that equimolar amounts of Cd and S are obtained. Stirring was continued for a while when the solution changed from optically transparent colorless to optically transparent yellow. Although semiconductor nanoparticles that have been stabilized by hexametaphosphate are already present in the solution at this point in time, these semiconductor nanoparticles have a wide particle size distribution and their standard deviation reaches as much as 15% or more of the average particle size. Therefore, the resultant solution was then irradiated with light, thereby obtaining an aqueous solution of monodispersed CdS nanoparticles.

(Modification and Purification of the Surface of the Semiconductor Nanoparticles)

In order to purify the semiconductor nanoparticles obtained by the above-described method, 50 µL of mercaptopropionic acid (MPA) was added to the solution, which was then stirred for several hours to perform surface modification. Ultrafiltration was then performed to remove methyl viologen, hexametaphosphoric acid, unreacted thiol compound, ions dissolved at the time of photoetching, or the like in the aqueous solution. Thus, a pure solution of semiconductor nanoparticles that were stabilized with a thiol compound was obtained. The resultant semiconductor nanoparticles whose surface had been modified by the thiol compound were then condensed by ultrafiltration, and a flow washing was further performed with pure water.

(Method of Treating the Surface of Semiconductor Nanoparticles: Inventive Method)

The purified and thiol-modified nanoparticles obtained by the above-described method were subjected to surface treatment. In the present example, an example of a surface treating method using ammonia water is described.

Figure 1:
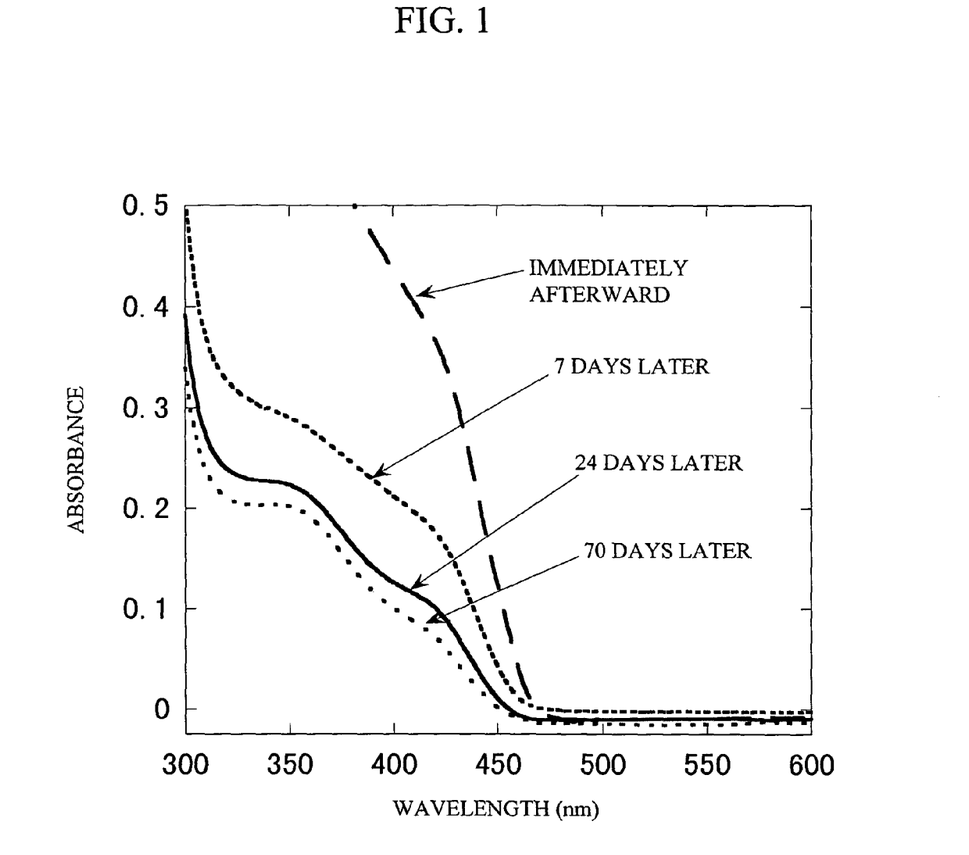
FIG. 1 shows changes over time in absorption spectra in cases where surface modification has been performed using ammonia water.
Figure 2:
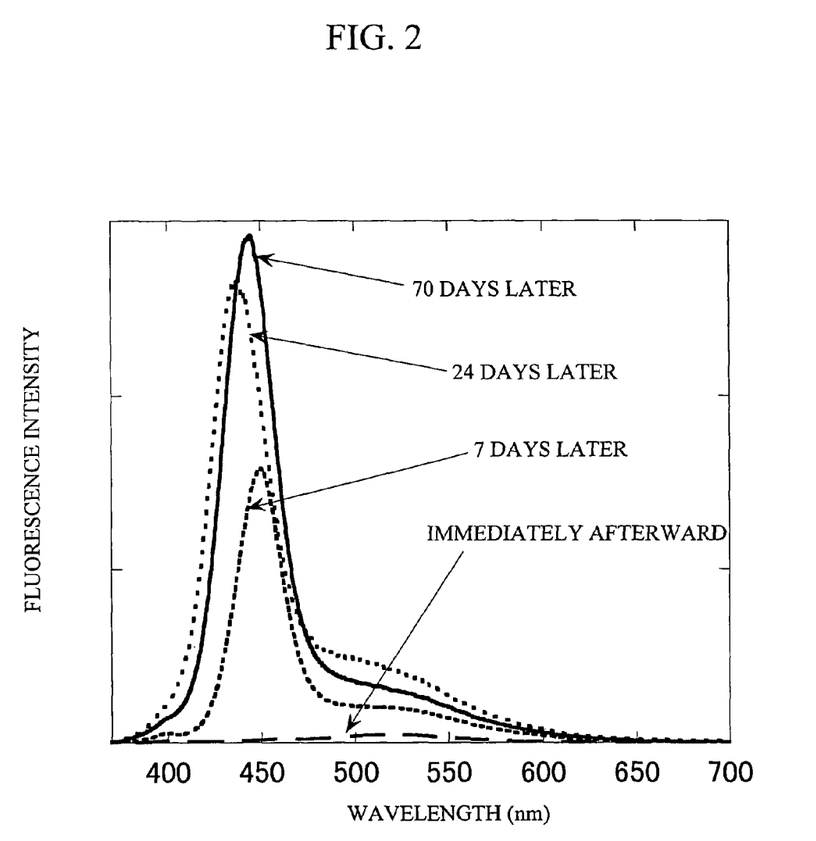
FIG. 2 shows changes over time in fluorescent spectra in cases where surface modification has been performed using ammonia water.

An aqueous solution of the purified and thiol-modified nanoparticles obtained as described above was diluted with 0.1M $NH_3$ aq. to an absorbance of 0.25 at 435 nm. The solution was allowed to stand for several days to several weeks to treat the surface, thereby obtaining a semiconductor nanoparticle solution with excellent light-emitting properties. Temporal changes in the absorption spectrum of the semiconductor nanoparticle solution prepared by the above-described method, and temporal changes in the fluorescence spectrum of the solution when excited by light with a wavelength of 350 nm, are shown in FIGS. 1 and 2, respectively. The resultant solution was optically transparent yellow and had excellent light-emitting properties. However, this method requires several days to weeks of time and period, posing a problem when utilizing semiconductor nanoparticles.

SUMMARY OF THE INVENTION

In view of the problems of the prior art, it is an object of the invention to significantly reduce the time and period required for reaction by adding a surface-treating material to semiconductor nanoparticles in order to provide the semiconductor nanoparticles with one or more kinds of electron-releasing groups, and promoting a reaction in which the surface of the semiconductor nanoparticles is dissolved and in which the electron-releasing groups are arranged on the surface of the core of the semiconductor nanoparticles.

Having realized that it was possible to synthesize semiconductor nanoparticles with excellent light-emitting properties by modifying the surface of the semiconductor nanoparticles with an aqueous solution of sodium hydroxide or that of amine compound and ammonia compound, the inventors conducted a number of experiments. However, since this method required several days to weeks of time, a need existed to reduce such a long period of time.

The invention was made based on the inventors' realization that the aforementioned problem can be solved by conducting the aforementioned surface-modifying process in a specific environment.

Specifically, a surface-treating material is added to the semiconductor nanoparticles that provide them with one or more kinds of electron-releasing groups, and a reaction in which the electron-releasing groups are arranged on the surface of the core of the semiconductor nanoparticles is accelerated by optical irradiation. In accordance with this invention, semiconductor nanoparticles with fluorescence properties can be produced in a short time.

The light with which irradiation is conducted is not particularly limited, and it may be selected from the group of light rays consisting of ultraviolet ray, visible ray, and infrared ray.

The material that is used for providing the surface of the semiconductor nanoparticles with electron-releasing groups may be at least one selected from the group of nitrogen-containing compounds consisting of alkaline metal hydroxides, alkaline earth metal hydroxides, ammonia, amines, ammoniums, nitrites, and isocyanates, or the group of oxygen-containing compounds consisting of alcohols, phenols, ketones, aldehydes, carboxylic acids, esters of organic or inorganic acids, ethers, acid amides, and acid anhydrides. In particular, at least one selected from the group consisting of ammonia, primary amines ($R^1NH_2$), secondary amines ($R^1R^2NH$), tertiary amines ($R^1R^2R^3N$), quaternary ammonium compounds ($R^4R^5R^6R^7N^+$) is preferable, where R is selected from the group consisting of hydrogen and substituted or unsubstituted hydrocarbon groups.

In a concrete example of the invention, the surface of the semiconductor nanoparticle that has been modified by a thiol group may be treated in an alkali environment so as to ionize and liberate the thiol compound, and a reaction in which a surface-treating material is added to provide electron-releasing groups may be accelerated by optical irradiation.

The semiconductor nanoparticle that are manufactured in accordance with the invention may be water-soluble.

The surface of the semiconductor nanoparticle manufactured may be further stabilized by an ionic compound. The ionic compound may be at least one selected from the group consisting of ammonia, primary amines ($R^1NH_2$), secondary amines ($R^1R^2NH$), tertiary amines ($R^1R^2R^3N$), quaternary ammonium compounds ($R^4R^5R^6R^7N^+$), where $R^1$ to $R^7$ are selected from the group consisting of hydrogen and substituted or unsubstituted hydrocarbon groups.

The material of the core of the semiconductor nanoparticles as raw material is not particularly limited and conventional semiconductor nanoparticle may be employed. Examples are semiconductor nanoparticles selected from the group consisting of ZnO, ZnS, ZnSe, ZnTe, CdO, CdS, CdMnS, CdSe, CdMnSe, CdTe, CdMnTe, HgS, HgSe, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si. Other preferable examples include metal nanoparticles of gold or platinum.

The semiconductor nanoparticles as raw material are preferably modified with a thiol group-containing compound in advance in order to promote the reaction in accordance with the invention.

In accordance with the invention, a significant cut can be made in the time required for the process of surface modification as compared with conventional methods.

DETAILED DESCRIPTION OF THE PREFERRED EMBODIMENTS

Figure 3:
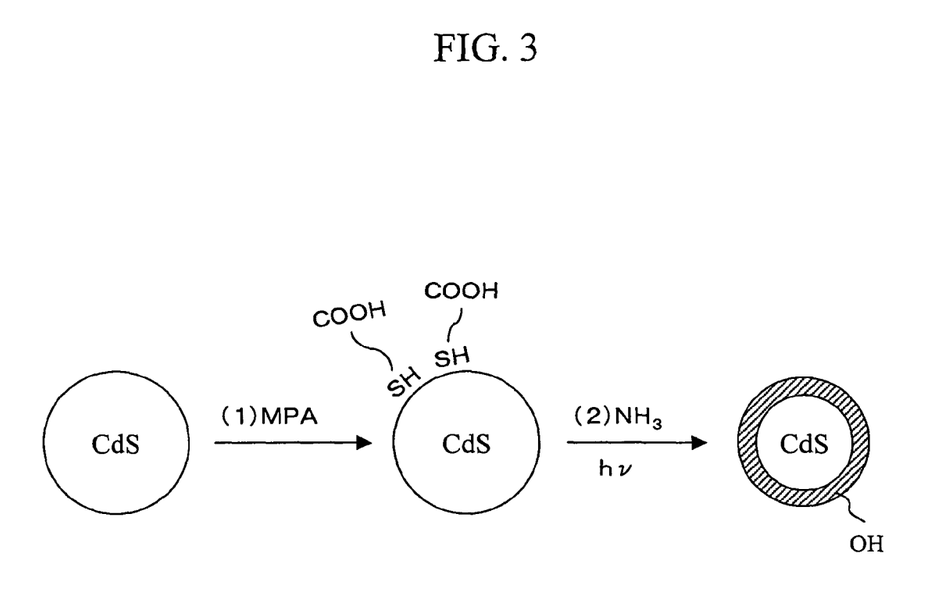
FIG. 3 shows an example of a reaction scheme in accordance with the invention.

FIG. 3 shows an example of a reaction scheme of the invention. The reaction scheme consists of a reaction (Reaction 1) in which the surface of a semiconductor nanoparticle (CdS) is modified by a compound (MPA) having a thiol group, and a reaction (Reaction 2) in which a surface-treating material (NH3) for providing the thiol group-modified semiconductor nanoparticle with electron-releasing groups is added under optical irradiation in order to provide the particle surface with the electron-releasing groups.

Hereafter the above reaction is described in specific terms.

1000 ml of aqueous solution of sodium hexametaphosphate (0.1 mmol) and cadmium perchlorate (0.2 mmol) was prepared and adjusted to a pH of 10.3. Thereafter, the solution was subjected to bubbling using nitrogen gas, and hydrogen sulfide gas (0.2 mmol) was poured into the solution while vigorously stirring. Thereafter, stirring was carried out for a while, when the solution changed from optically transparent colorless to optically transparent yellow. The resultant solution was irradiated with an argon ion laser of 457.9 nm, thereby obtaining an aqueous solution of semiconductor nanoparticles (CdS) with a monodispersed particle size.

In order to further purify the thus obtained semiconductor nanoparticles, 50 µL of mercaptopropionic acid (MPA) was added, and the mixture was stirred for several hours to perform surface modification. Further, ultrafiltration was performed to remove methyl viologen, hexametaphosphoric acid, unreacted thiol compound, ions dissolved at the time of photoetching, or the like in the aqueous solution, thereby obtaining a pure solution of semiconductor nanoparticles that were stabilized with a thiol compound. 1 L of the obtained semiconductor nanoparticle whose surface was modified by the thiol compound was then concentrated to 10 mL by ultrafiltration, followed by a flow washing with pure water (Reaction 1).

Surface modification was then performed using the purified and thiol-modified nanoparticles obtained by the above-described method (Reaction 2). In the present example, a surface treating method using ammonia water is described.

EXAMPLE 1

(Black-light Irradiation)

Figure 4:
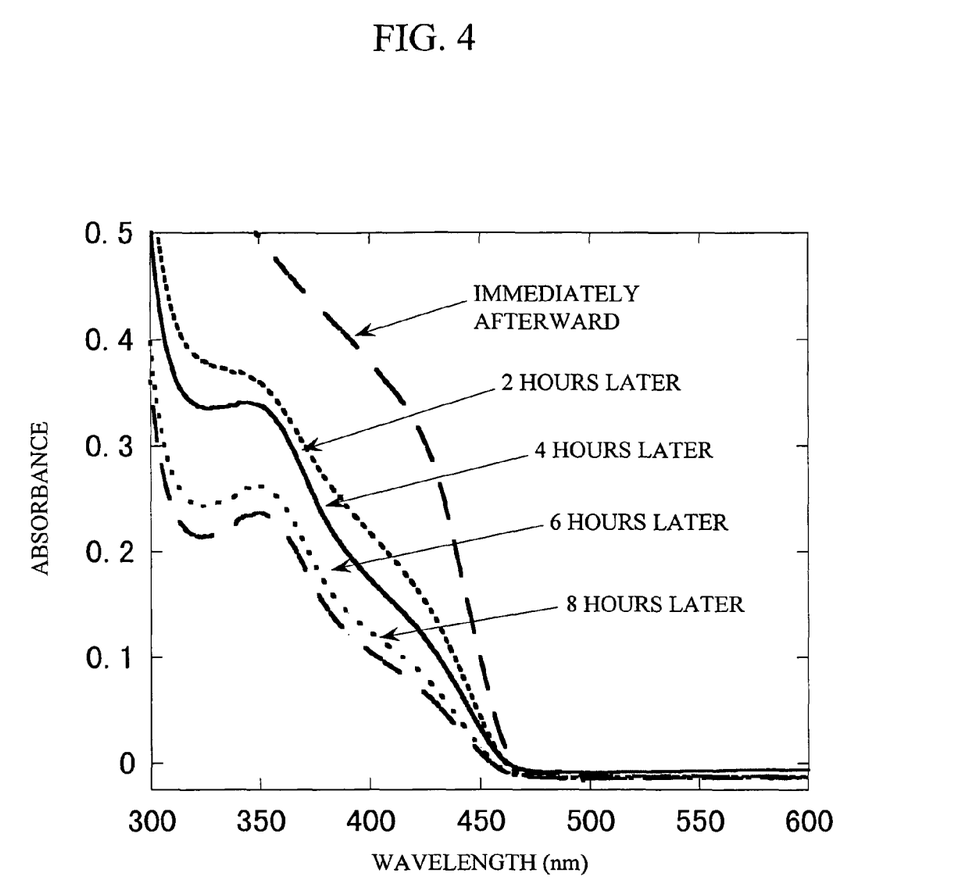
FIG. 4 shows changes over time in absorption spectra in cases where surface modification has been performed according to Example 1.
Figure 5:
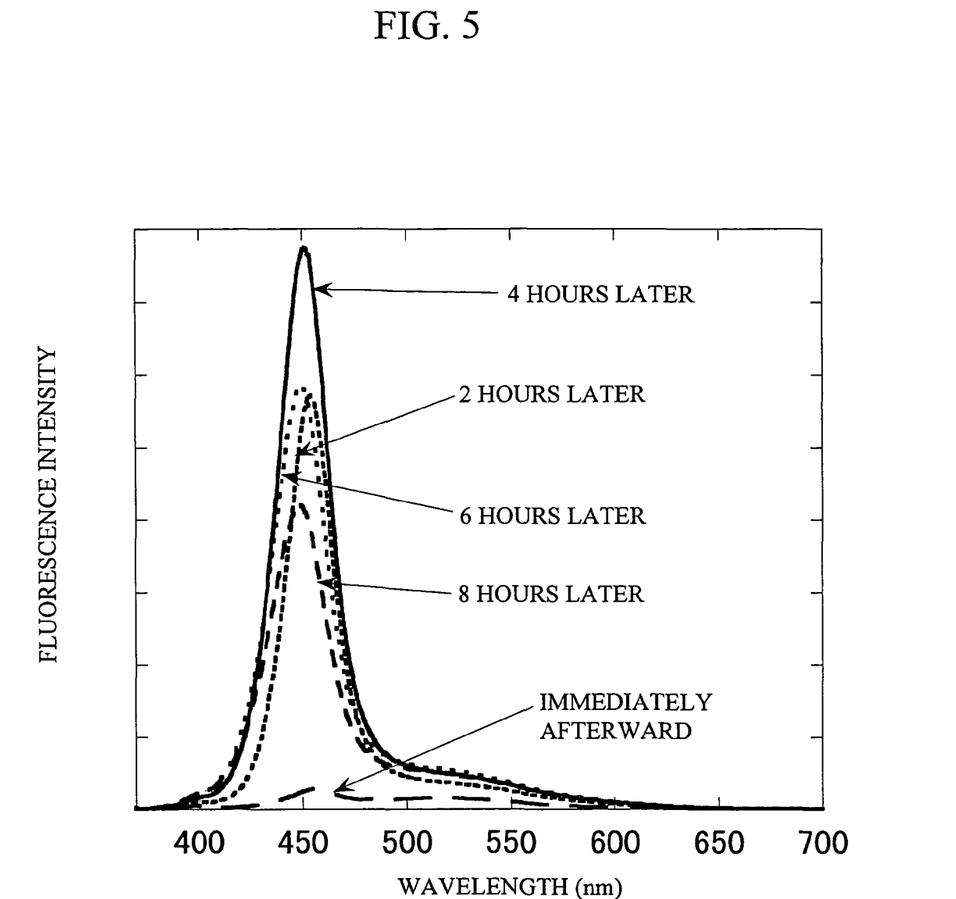
FIG. 5 shows changes over time in absorption spectra in cases where surface modification has been performed according to Example 1.

An aqueous solution of the purified and thiol-modified nanoparticles obtained as described above was diluted with 0.1M $NH_3$ aq. such that absorbance was 0.25 at 435 nm, and the solution was then irradiated with black light for several hours. As a result, CdS nanoparticles with excellent light-emitting properties were obtained. Temporal changes in absorption spectrum and fluorescent spectrum upon excitation with light of 350 nm are shown in FIGS. 4 and 5, respectively.

EXAMPLE 2

(Fluorescent Light Irradiation)

Figure 6:
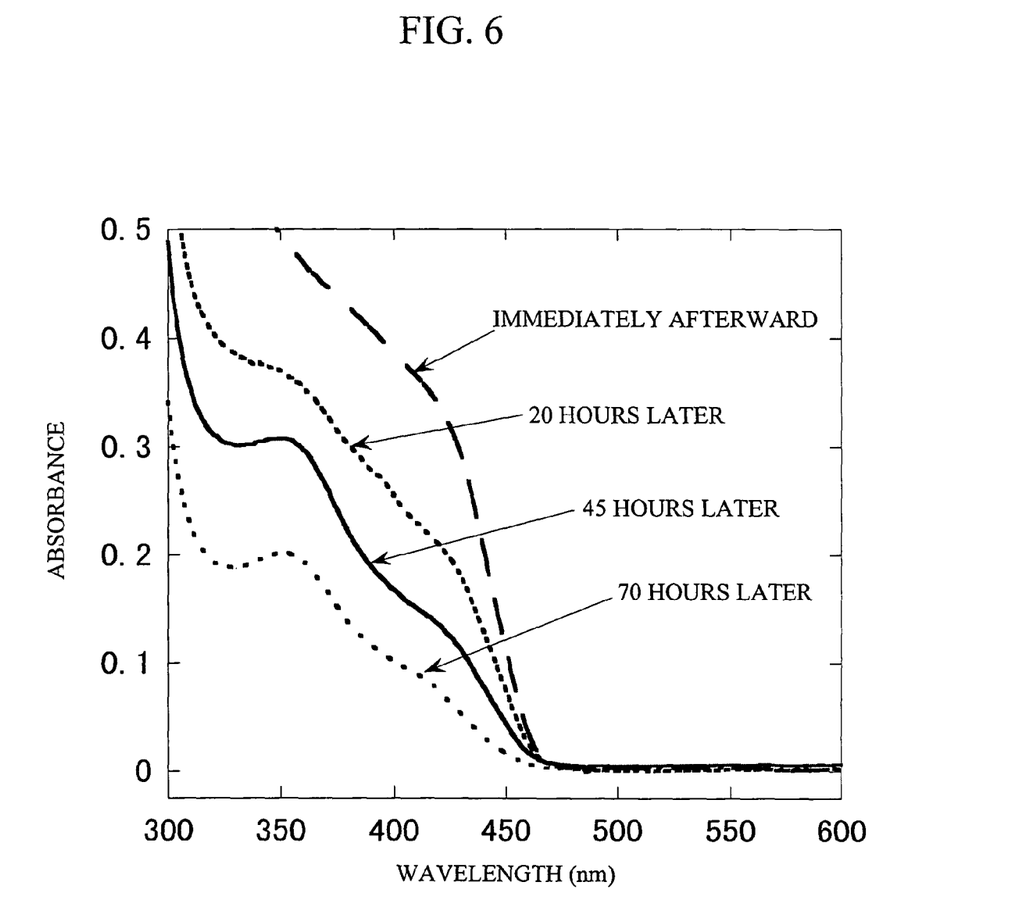
FIG. 6 shows changes over time in absorption spectra in cases where surface modification has been performed according to Example 2.
Figure 7:
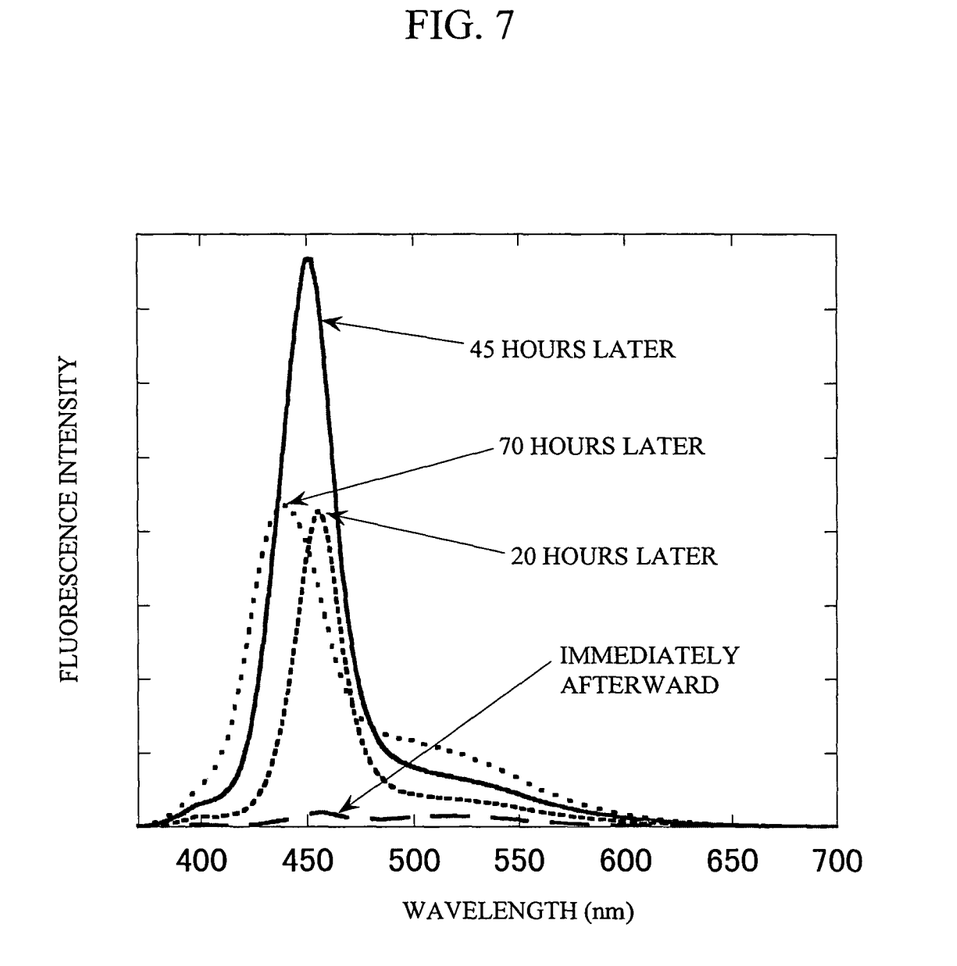
FIG. 7 shows changes over time in absorption spectra in cases where surface modification has been performed according to Example 2.

An aqueous solution of the purified and thiol-modified nanoparticles obtained as described above was diluted with 0.1M $NH_3$ aq. such that absorbance was 0.25 at 435 nm, and the solution was then directly irradiated with fluorescent light for several hours. As a result, CdS nanoparticles with excellent light-emitting properties were obtained. Temporal changes in absorption spectrum and fluorescent spectrum upon excitation with light of 350 nm are shown in FIGS. 6 and 7, respectively.

Demonstration of Effectiveness

Figure 8:
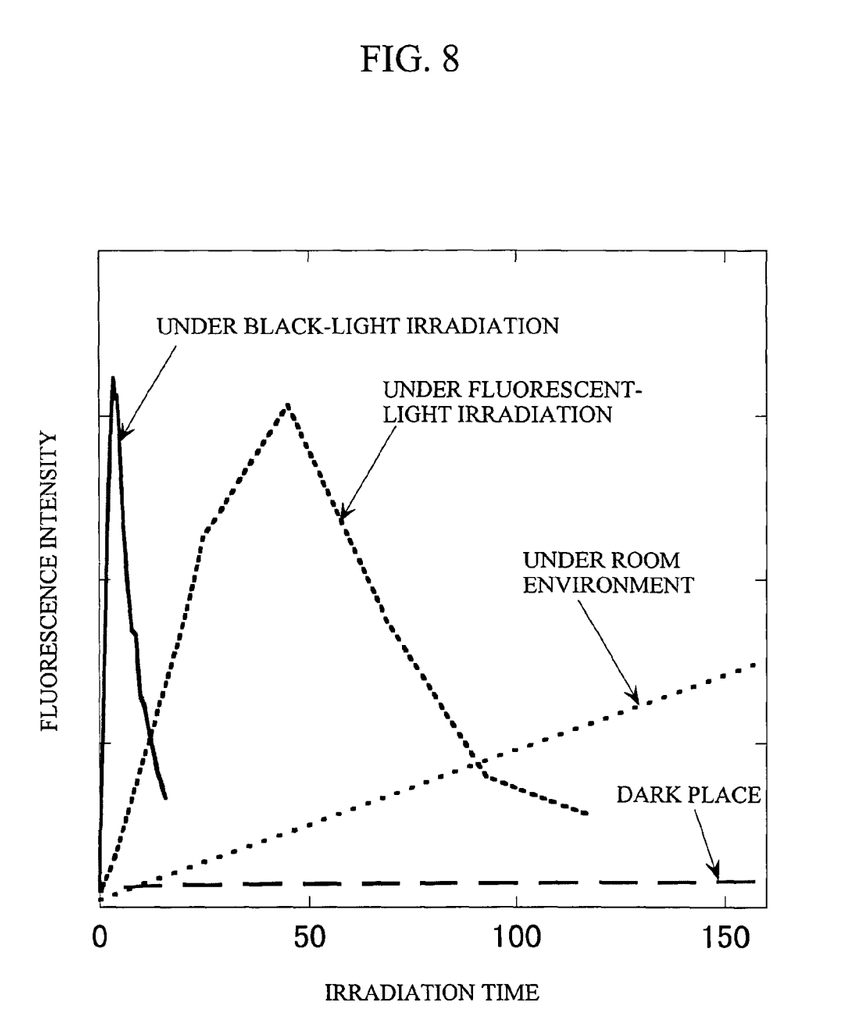
FIG. 8 shows a comparison of maximum fluorescence intensity in cases where surface modification has been performed using a variety of types of irradiation light.

In order to examine the effectiveness of optical irradiation, changes in fluorescence behavior were compared among different environments, namely under blacklight, fluorescent light, in an ordinary room with a fluorescent lamp, and in a dark place. FIG. 8 shows a graph comparing the different light sources in terms of maximum fluorescence intensity when excited with light of 350 nm.

The results shown in FIG. 8 show that a significant increase in fluorescence intensity is observed in the cases involving black light and direct fluorescent light irradiation, indicating that the surface treatment is promoted by optical irradiation. The results also showed that the required time or period can be reduced significantly by the black light and direct fluorescent light irradiation as compared with conventional methods, namely the optical irradiation in an ordinary room with a fluorescent lamp.

Thus, the surface-modifying process can be performed in a significantly shorter time by conducting it under optical irradiation.

Although the foregoing description was particularly related to a method using an aqueous solution of ammonia, various other alkali solutions, such as aqueous solutions of sodium hydroxide, amine compound, or ammonium compound, or compounds that can provide the surface of semiconductor nanoparticles with electron-releasing groups, such as —OR, —$OCH_2R$, —$OCOCH_2R$, —NHR, —$N(CH_2R)_2$, —$NHCOCH_2R$, —$CH_2R$, —$C_6H_4R$, where R is selected from the group consisting of hydrogen and substituted or unsubstituted hydrocarbon groups, can be used for similar effects.

In accordance with the invention, the time or period required for a reaction for modifying the surface of semiconductor nanoparticles using ammonia water or the like can be significantly reduced by optical irradiation. Thus, the invention is useful in applying semiconductor nanoparticles, which have excellent fluorescent properties, in many fields.

What is claimed is:

1. A method of manufacturing a semiconductor nanoparticle with fluorescent properties, said method comprising:
simultaneously chemically treating a surface of a semiconductor nanoparticle while optically irradiating the surface of a semiconductor nanoparticle to produce one or more kinds of electron-releasing groups on the surface of said semiconductor nanoparticle, wherein the optical irradiating accelerates the production of electron-releasing groups on said semiconductor nanoparticle surface.

2. The method of manufacturing a semiconductor nanoparticle according to claim 1, wherein a light used for said optically irradiating comprises a light ray selected from the group consisting of ultraviolet ray, visible ray, and infrared ray.

3. The method of manufacturing a semiconductor nanoparticle according to claim 1, wherein said surface-treating material for providing the surface of said semiconductor nanoparticle with electron-releasing groups is at least one selected from the group of nitrogen-containing compounds consisting of alkaline metal hydroxides, alkaline earth metal hydroxides, ammonia, amines, ammoniums, nitriles, and isocyanates, or the group of oxygen-containing compounds consisting of alcohols, phenols, ketones, aldehydes, carboxylic acids, esters of organic or inorganic acids, ethers, acid amides, and acid anhydrides.

4. The method of manufacturing a semiconductor nanoparticle according to claim 1, wherein said surface-treating material for providing the surface of said semiconductor nanoparticle with electron-releasing groups is at least one selected from the group consisting of ammonia, primary amines ($R^1NH_2$), secondary amines ($R^1R^2NH$), tertiary amines ($R^1R^2R^3N$), quaternary ammonium compounds ($R^4R^5R^6R^7N^+$), where R is selected from the group consisting of hydrogen and substituted or unsubstituted hydrocarbon groups.

5. The method of manufacturing a semiconductor nanoparticle according to claim 1, wherein the semiconductor nanoparticle that is manufactured is water-soluble.

6. The method of manufacturing a semiconductor nanoparticle according to claim 1, wherein the surface of the semiconductor nanoparticle manufactured is further stabilized by an ionic compound.

7. The method of manufacturing a semiconductor nanoparticle according to claim 6, wherein the ionic compound is at least one selected from the group consisting of ammonia, primary amines ($R^1NH_2$), secondary amines ($R^1R^2NH$), tertiary amines ($R^1R^2R^3N$), quaternary ammonium compounds ($R^4R^5R^6R^7N^+$), where $R^1$ to $R^7$ are selected from the group consisting of hydrogen and substituted or unsubstituted hydrocarbon groups.

8. The method of manufacturing a semiconductor nanoparticle according to claim 1, wherein the material of the core of the semiconductor nanoparticle is selected from the group consisting of ZnO, ZnS, ZnSe, ZnTe, CdO, CdS, CdMnS, CdSe, CdMnSe, CdTe, CdMnTe, HgS, HgSe, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si.

9. The method of manufacturing a semiconductor nanoparticle according to claim 1, wherein the semiconductor nanoparticle is modified with a thiol group-containing compound in advance.

10. The method of manufacturing a semiconductor nanoparticle according to claim 9, wherein the surface of said semiconductor nanoparticle that has been modified by a thiol group is treated in an alkali environment so as to ionize and liberate the thiol compound, and then said surface-treating material for providing electron-releasing groups is added in order to substitute a functional group.

11. The method of manufacturing a semiconductor nanoparticle according to claim 1, wherein the electron-releasing groups are —OR, —$OCH_2R$, —$OCOCH_2R$, —NHR, —$N(CH_2R)_2$, —$NHCOCH_2R$, —$CH_2R$, —$C_6H_4R$, where R is selected from the group consisting of hydrogen and substituted or unsubstituted hydrocarbon groups.

* * * * *